US005930237A

United States Patent [19]
Horiuchi et al.

[11] Patent Number: 5,930,237
[45] Date of Patent: Jul. 27, 1999

[54] VIDEO CONFERENCE SYSTEM WITH ATM CELL REUSE

[75] Inventors: Edward M. Horiuchi, Glendale; David A. Smiley, Peoria; Daryl P. Slaviero, Glendale, all of Ariz.

[73] Assignee: AG Communication Systems Corporation, Phoenix, Ariz.

[21] Appl. No.: 08/885,580

[22] Filed: Jun. 30, 1997

[51] Int. Cl.[6] .......................... H04L 12/16; H04Q 11/00
[52] U.S. Cl. ..................... 370/260; 370/253; 370/325; 370/265; 370/263
[58] Field of Search ..................... 370/260, 263, 370/265, 270, 395, 253, 325; 348/15, 16, 17; 379/21, 93

[56] References Cited

U.S. PATENT DOCUMENTS

| | | | |
|---|---|---|---|
| 5,402,418 | 3/1995 | Shibata et al. | 370/62 |
| 5,748,615 | 5/1998 | Riedel et al. | 370/253 |
| 5,818,513 | 10/1998 | Sano et al. | 370/260 |
| 5,850,389 | 12/1998 | Wesler | 370/325 |

Primary Examiner—Jeffery A. Hofsass
Assistant Examiner—Daniel Previl
Attorney, Agent, or Firm—David J. Zwick; Gregory G. Hendricks

[57] ABSTRACT

A multipoint video conferencing system in which the video conferencing terminals are in a daisy-chain arrangement with the head-of-chain terminal connected to the ATM network. ATM cells are relayed from the ATM network downstream to the last terminal, and from each terminal upstream to the network. Each video conference terminal has a video program input port provisioned with a unique ATM address, and a plurality of video program out ports, each provisioned with one of the video program input port addresses. ATM cells generated from each video program input port are transmitted upstream to the ATM network where they are relayed back to the head-of-chain terminal and then downstream to the last terminal. Each video conferencing terminal may also receive ATM cells having addresses that match the addresses provisioned for its video program output ports. These cells are converted to analog video programs and transmitted out the associated video output ports. In this manner, an ATM cell may be used on several video conferencing terminals.

3 Claims, 8 Drawing Sheets

VIDEO CONFERENCE SYSTEM WITH ATM CELL REUSE

FIELD OF THE INVENTION

The present invention relates to video conferencing systems, and more particularly to video conferencing systems using asynchronous transport mode (ATM) networks.

BACKGROUND OF THE INVENTION

In a typical multi-point video conferencing system, video information generated by a camera on one terminal is duplicated and sent to each video monitor port of the other terminals. Thus, the network traffic generated by each of the cameras is multiplied by the total number of monitor ports on all the other terminals. In certain network topologies, the additional traffic resulting from this duplication of video information can negatively impact the network and require a greater investment in network infrastructure. For example, in an arrangement where all the terminals are connected to a single network segment, the duplication of video traffic for all terminal monitor ports is carried on the lead network connection of the segment and could contribute to localized network overload problems.

Accordingly, it is an object of the present invention to provide a video conferencing system that will reduce the duplication of video information on the network to a minimum level required by the network topology.

SUMMARY OF THE INVENTION

The present invention provides a multi-point video conferencing system for use in an ATM network. The system is preferably arranged such that a first video conferencing terminal is connected to an ATM network, and the other terminals are connected in a daisy-chain arrangement to the first terminal. Each video conferencing terminal has an audio/video (A/V) transmit port connected to a local video camera that generates information for transmission onto the network, and a plurality of A/V receive ports connected to A/V monitors to display information received from the network generated by the remote terminals in the system. Each terminal's A/V transmit port has a unique ATM address. The A/V receive ports on a terminal preferably accept the ATM addresses of the transmit ports of each of the other video conference terminals.

Information generated by the video cameras is converted to ATM cells, transmitted out of the video conference terminals and forwarded up the daisy-chain to the first video conferencing terminal and then onto the ATM network. The network then generates relay cells having addresses of the receive ports of the video conferencing system, and relays these cells back to the first video conferencing terminal. In general, the ATM addresses of the relayed cells may be remapped to a different address than the ATM addresses of the cells generated by the A/V transmit ports and received by the ATM network, but the remapped cell addresses will be one-to-one with the ATM addresses of the A/V transmit ports. These cells are then forwarded down the daisy-chain to the last terminal.

Each cell received from the network, in addition to being forwarded down the daisy chain, is examined by each terminal. If the cell address matches the address of one of the receive ports of a terminal, the cell is processed for display on the A/V monitor attached to that port. Because each terminal's receive ports are provisioned with the addresses of the transmit ports of each of the other terminals, the same ATM cell will be reused by all terminals in the daisy-chain, except for the terminal that generated the cell.

In this manner, each cell need only be relayed once per video conference terminal transmit port rather than once per receive port, resulting in an exponential reduction in ATM cell traffic received by the first terminal by a ratio of approximately $(N^2-N)$ to N, where N is the number of video conference terminals in the system.

DESCRIPTION OF THE PREFERRED EMBODIMENT

Figure 1:
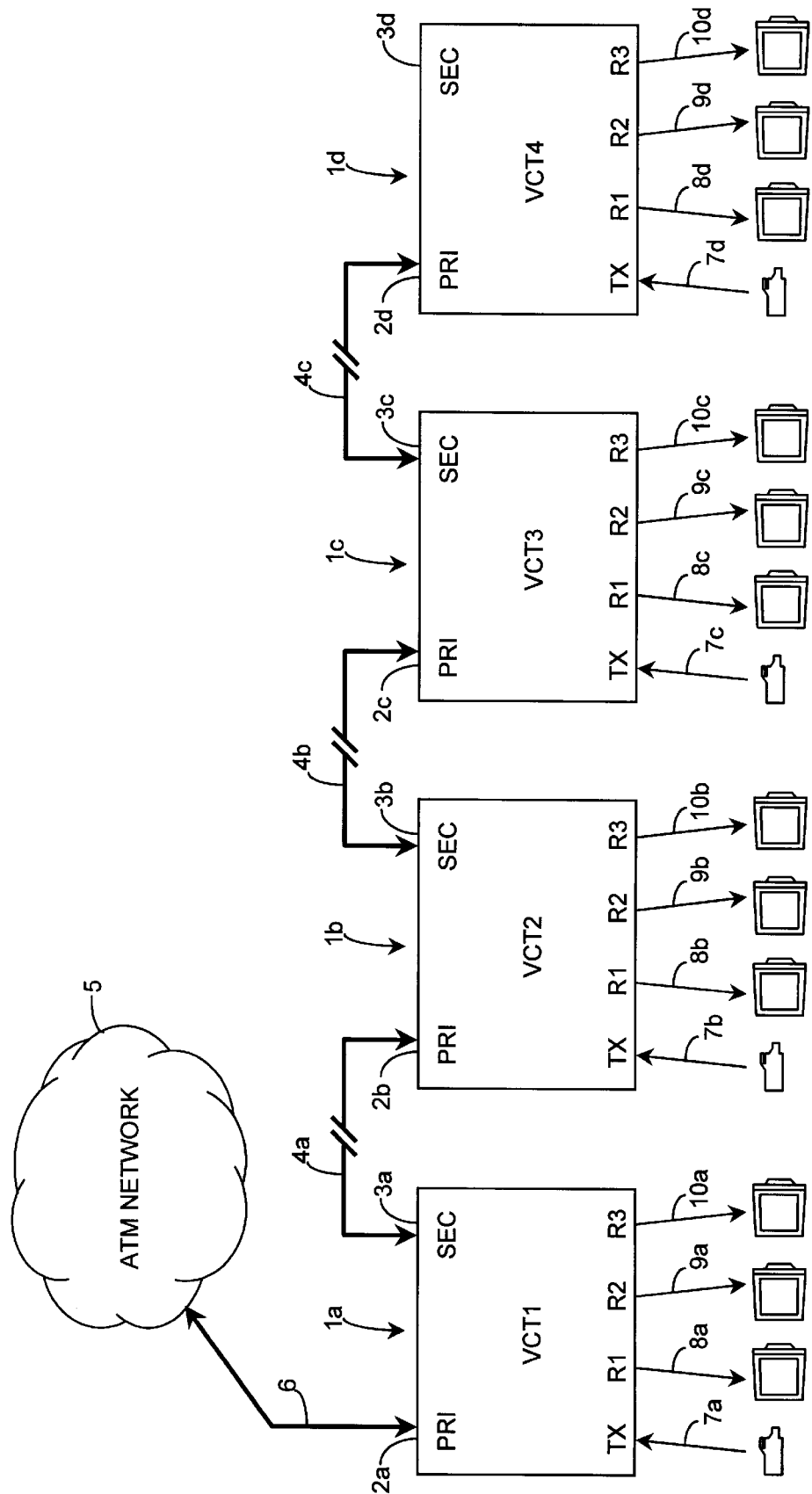
FIG. 1 is a block diagram of the preferred embodiment of video conference system of the present invention.

FIG. 1 is a block diagram of the preferred embodiment of video conference system of the present invention. Video conference terminals VCT1 1a to VCT4 1d have primary ATM transmit and receive ports 2a to 2d and secondary ATM transmit and receive ports 3a to 3d.

Video conference terminals VCT1 1a to VCT4 1d are daisy-chained together over synchronous optical network (SONET) connections 4a to 4c. As shown, each daisy-chain connection 4 connects a terminal's secondary port 3 to the primary port 2 of the next downstream terminal. Each video conference terminal 1 has an A/V transmit port 7 connected to a video camera, and receive ports 8 to 10 connected to A/V monitors. The head-of-chain terminal VCT1 1a is connected to an ATM network 5 over SONET connection 6 at its primary ATM port 2a. At a minimum, ATM network 5 consists of an ATM switch.

In operation, each of the four transmit ports 7 in the video conferencing system is provisioned with a unique ATM address composed of the VPI(virtual path identifier)/VCI (virtual connection identifier) fields. Each terminal's receive ports 8 to 10 are provisioned with the one of the VPI/VCI addresses associated with the ATM cells transmitted from the other terminals. For example, receive ports 8a to 10a of terminal VCT1 1a are provisioned with the VPI/VCI addresses associated with ATM cells from transmit ports 7b, 7c, and 7d, receive ports 8b to 10b of terminal VCT2 1b are provisioned with the VPI/VCI addresses of transmit ports 7a, 7c, and 7d, and so on.

The video conferencing terminals of the present invention operate in accordance with the ATM Forum specification "User Network Interface (UNI) Specification, Version 3.1," September 1994, which is hereby incorporated by reference.

In the preferred embodiment as illustrated in FIG. 1, ATM network 5 is provisioned to relay each ATM cell generated from transmit ports 7 to primary port 2a of head-of-chain terminal VCT1 1a. In the general implementation, where video terminals 1 may comprise more than one terminal "chain" of one or more terminals connected to ATM network 5, ATM network 5 would be provisioned to multicast each ATM cell received from any of transmit ports 7 to all of the heads-of-chain terminals through their primary ports 2.

For example, video information generated by the video camera connected to transmit port 7c of terminal VCT3 1c is packetized into ATM cells with the VPI/VCI of port 7c and transmitted out of primary ATM transmit and receive port 2c, then over SONET connection 4b and into secondary ATM port 3b. Terminal VCT2 1b then forwards each cell out of primary ATM port 2b, then over SONET connection 4a and into secondary ATM port 3a. Terminal VCT1 1a then forwards the cells out of primary ATM port 2a onto ATM network 5 over SONET connection 6. ATM network 5 relays each cell back to head-of-chain terminal VCT1 1a over connection 6 and through primary ATM port 2a. Terminal VCT1 1a examines the VPI address, realizes a match for receive port 9a, and directs the cell to that port as well as forwarding the cell to terminal VCT2 1b over connection 4a. Terminal VCT2 1b examines the VPI address, realizes a match for receive port 9b, and directs the cell to that port, as well as forwarding the cell to terminal VCT3 1c over connection 4b. Terminal VCT3 1c examines the VPI address, realizes there is not a match for any of its receive ports and forwards the cell to terminal VCT4 1d over connection 4c. Terminal VCT4 1d examines the VPI address, realizes a match for receive port 10d, and directs the cell to that port. Since terminal VCT4 1d is the end of the daisy-chain, it does not forward the cell.

Figure 2A:
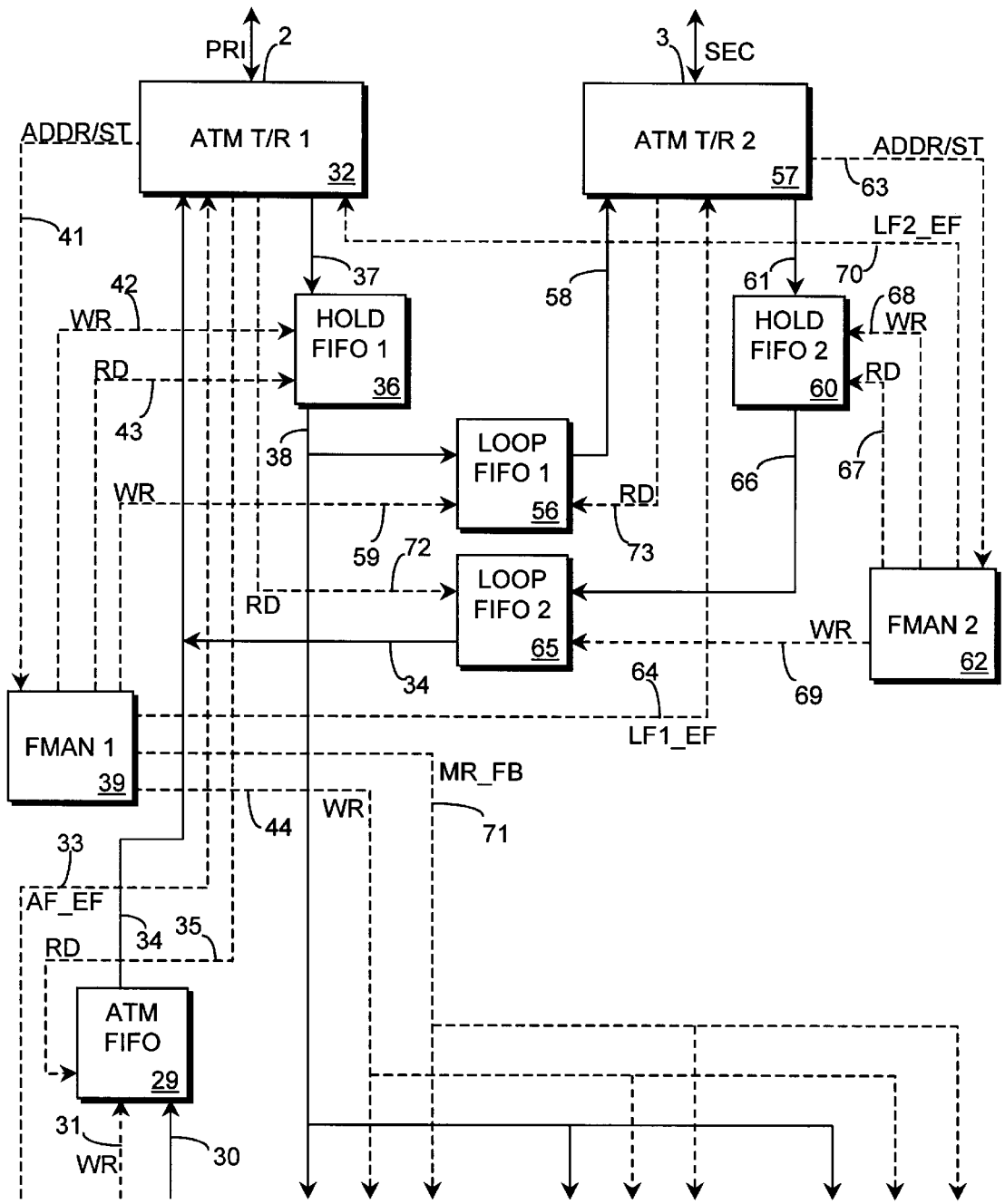
FIGS. 2a and 2b are a block diagram of the video conference terminal of the preferred embodiment of the present invention.
Figure 2B:
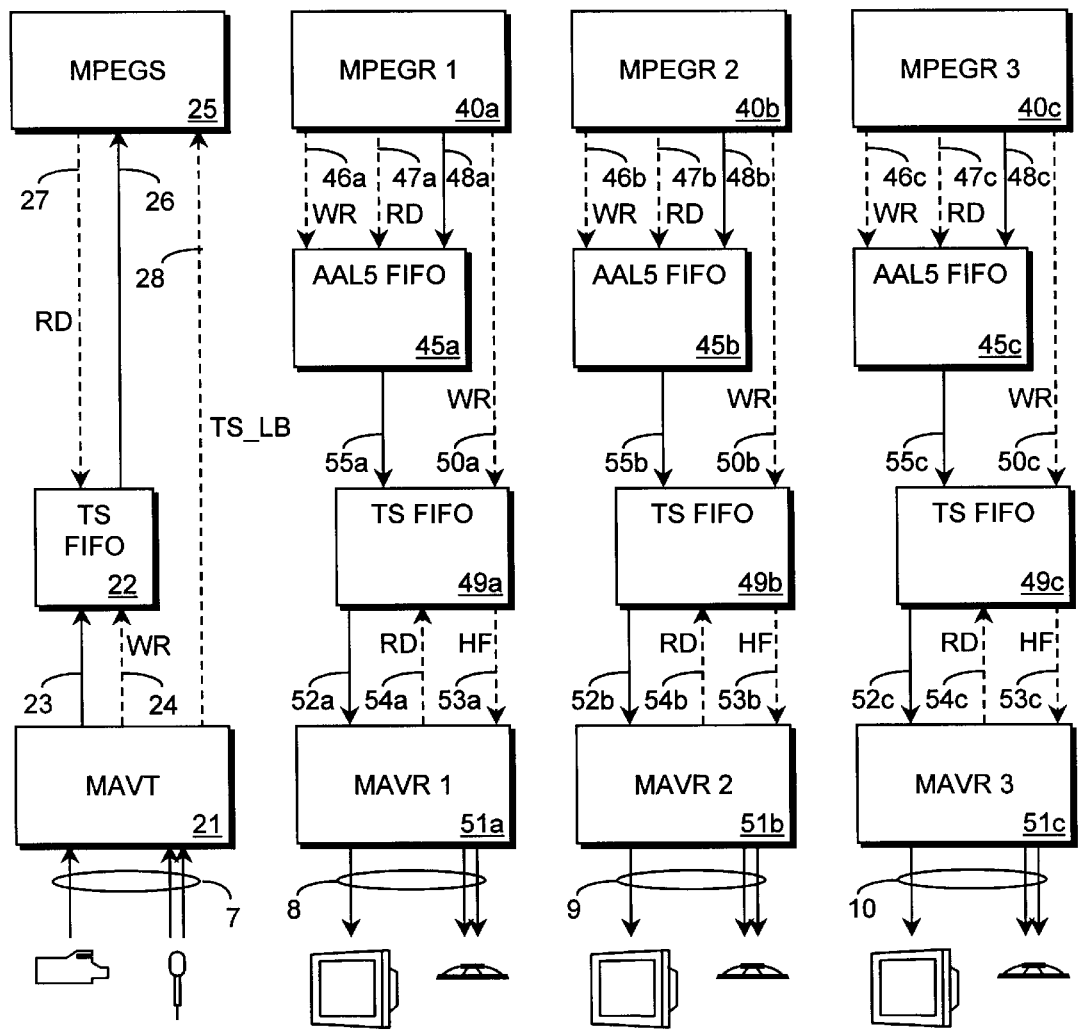

FIGS. 2a and 2b are a block diagram of the video conference terminals 1 of the preferred embodiment of the present invention. In these figures, data signals are indicated by solid lines, and control signals by dashed lines.

The video conference terminal of the present invention can be divided into three logical functions. The first function is the A/V transmit function wherein information generated from, for example, a video camera is transmitted onto the ATM network. This function comprises MPEG-2 A/V transmitter circuit MAVT 21, which receives video and audio signals over connections 7 from the video camera. Transport stream packet FIFO circuit TS FIFO 22 receives from MAVT 21 a data signal over lead 23 and a write control signal over lead 24. MPEG-2 segmentation circuit MPEGS 25 receives from TS FIFO 22 a data signal over lead 26 and transmits to TS FIFO 22 a read control signal over lead 27, and receives from MAVT 21 a TS FIFO packet last byte written control signal TS_LB over lead 28. MPEGS 25 further transmits to ATM cell FIFO circuit ATM FIFO 29 a data signal over lead 30 and a write signal over lead 31. MPEGS 25 also transmits to ATM transmitter/receiver ATM T/R 1 32 an ATM FIFO empty flag control signal AF_EF over lead 33. ATM FIFO 29 further transmits to ATM T/R 1 32 a data signal over lead 34 and receives from ATM T/R 1 32 a read control signal over lead 35. ATM T/R 1 32 is further connected to ATM network 5 over primary port 2.

The second function is the A/V receive function wherein A/V information is received from the ATM network and is displayed on A/V monitors connected to the video conference terminal. This function comprises ATM T/R 1 32 which transmits to HOLD FIFO 1 36 a data signal over lead 37. ATM T/R 1 32 also transmits to FIFO manager circuit FMAN 1 39 an ATM cell destination address and write strobe control signal over lead 41. FMAN 1 39 further transmits to HOLD FIFO 1 36 a write control signal and a read control signal over leads 42 and 43, respectively, and a write control signal to MPEG-2 reassembly circuits MPEGR 1 40a, MPEGR 2 40b, MPEGR 3 40c, over lead 44. HOLD FIFO 1 36 further transmits a data signal to MPEG-2 reassembly circuits 40 over lead 38. Each of MPEG-2 reassembly circuits 40 transmits to a FIFO circuit AAL5 FIFO 45 read and write control signals over leads 46 and 47, respectively, and a data signal over leads 48. MPEG-2 reassembly circuits 40 further transmit to transport stream FIFOs TS FIFO 49 write signals over leads 50. TS FIFOs 49 also receive from AAL5 FIFOs 45 a data signal over leads 55. TS FIFOs 49 further transmit to MPEG-2 A/V receive circuits 51 data signals over leads 52 and FIFO empty control signals over leads 53. MPEG-2 A/V receive circuits 51 transmit to TS FIFOs 49 read control signals over leads 54. MPEG-2 A/V receive circuits 51 further transmit audio and video signals over connections 8 to 10 to, for example, A/V monitors and speakers attached to the video conference terminal.

The third function is the ATM cell forward function wherein cells are forwarded by an upstream video conference terminal to downstream terminals, and by a downstream terminal to upstream terminals and onto the ATM network. This function comprises ATM T/R 1 32 which transmits to HOLD FIFO 1 36 a data signal over lead 37, and to LOOP FIFO 2 65 a read control signal over lead 72. HOLD FIFO 1 36 transmits a data signal over lead 38 to LOOP FIFO 1 56. LOOP FIFO 1 56 transmits a data signal to ATM T/R 2 57 over lead 58, and also receives a write signal from FMAN 1 39 over lead 59. ATM T/R 2 57 further transmits a data signal to HOLD FIFO 2 60 over lead 61, a read signal to LOOP FIFO 1 56 over lead 73, and an address and write strobe to FMAN 2 62 over lead 63, and receives from FMAN 1 39 a LOOP FIFO 1 empty flag over lead 64. HOLD FIFO 2 60 further transmits a data signal to LOOP FIFO 2 65 over lead 66, and LOOP FIFO 2 65 transmits a data signal to ATM T/R 1 32 over lead 34. FMAN 2 62 transmits to HOLD FIFO 2 60 a read and a write control signal over leads 67 and 68, respectively, a write control signal to LOOP FIFO 2 65 over lead 69, and a LOOP FIFO 2 EF control signal to ATM T/R 1 32 over lead 70.

The first function, the A/V transmit function wherein information generated from a video camera is transmitted onto the ATM network, operates as follows. MAVT 21 converts incoming analog audio and NTSC video data signals on connections 7 into MPEG-2 compressed digital video and audio data, which is then formed into MPEG-2 transport stream (TS) packets and written into TS FIFO 2 2 a byte at a time over data lead 23 by the write control signal on lead 24. As the last byte of each TS packet is written into TS FIFO 22, MAVT transmits TS packet last byte written signal TF_LB to MPEG-2 segmentation circuit MPEGS 25 over lead 28. When MPEGS 25 receives signal TF_LB, it initiates a state machine that reads the MPEG-2 TS packet out of TS FIFO 22 one byte at a time over data lead 26 by the read control signal on lead 27, and forms five- or eight-ATM cell AAL5 adaptation layer protocol data units (PDUs). The VPI/VCI address for the ATM cells is supplied by MPEGS 25 from an internal address register that is loaded at system initialization. The PDU ATM cells are written into ATM FIFO 29 one byte at a time over data lead 30 by the write control signal on lead 31. When ATM FIFO 29 contains one or more complete ATM cells, MPEGS de-asserts ATM FIFO empty flag signal AF_EF on lead 33 to ATM transmit/receive circuit ATM T/R 1 32. When it is able, ATM T/R 1 32 inserts complete ATM cells from ATM FIFO 29 into its primary port 2 outgoing data stream by reading cells one byte at a time over data lead 34 by the read control signal on lead 35.

The second function, the A/V receive function wherein A/V information is received from the ATM network and is displayed on A/V monitors connected to the video conference terminal, operates as follows. ATM T/R 1 32 receives ATM cells from ATM network 5, for the head-of-chain terminal, or from upstream terminals 1 through its primary port 2. When enough cell bytes have been received to determine the VPI/VCI address, ATM T/R 1 32 performs a match and mask compare of the address against internal registers and, based on the compare results, routes cells to one or more output port addresses. Cells may also be discarded if no address match occurs. When an output port address has been determined, cell data is written into HOLD FIFO 1 36. FIFO manager FMAN 1 39 receives the multi-bit port address strobe signal from ATM T/R 1 32 over lead 41. This address signal is latched into an FMAN 1 39 register for later use. All address strobe signal bits are then OR'd together in FMAN 1 39 to act as a write strobe signal that drives the write control signal from FMAN 1 39 to HOLD FIFO 1 36 on lead 42, causing the cell data to be written into HOLD FIFO 1 36 one byte at a time over data lead 37. When it is determined that the cell is valid, it is read out of HOLD FIFO 1 36 over data lead 38 into one or both of LOOP FIFO 1 56 and MPEG-2 reassembly circuits MPEGR 40, based on the latched port address signal. For the second video conference terminal function being discussed here, FMAN 1 39 transmits to MPEGR circuits 40a to 40c cell data first byte sync signal MR_FB on lead 71 and a write control signal on lead 44, and a read control signal on lead 43 to HOLD FIFO 1 36. This causes cell data to be written one byte at a time to MPEGR circuits 40 over data lead 38.

MPEGR circuits 40 are driven by state machines that accept the AAL5 adaptation layer PDU cell data bytes from HOLD FIFO 1 36 and form TS packets, including the AAL5 padding, in AAL5 FIFOs 45, which are then written into TS FIFOs 49, less the AAL5 padding bytes. Each of MPEGR circuits 40 first compares each VPI/VCI cell address to internal registers and only process cells for which there is a positive match and mask compare. MPEGR circuits 40 transmit write control signals over leads 46 to write TS packet bytes into AAL5 FIFOs 45 over data leads 48. When MPEGR circuits 40 have processed an entire AAL5 PDU, the length of the TS packet data bytes not including padding is determined and these data bytes are written to TS FIFOs 49 over data leads 55 by the write control signals on leads 50. When one or more TS packets have been written to a TS FIFO 49, it de-asserts the empty flag signal on lead 53 to MAVR circuit 51. The associated MAVR circuit 51 then reads the TS packet data from TS FIFO 49 one byte at a time over data lead 52 by the read signal on lead 54. MAVR circuits 51 decode the MPEG-2 compressed audio and video data contained in the TS packets into analog video and audio signals, which are transmitted to A/V monitors over leads 8 to 10.

The third function, the ATM cell forward function wherein cells are forwarded by an upstream video conference terminal to downstream terminals, and by a downstream terminal to upstream terminals and onto the ATM network, operates as follows. In the first case for ATM cells being forwarded downstream, as in the second function discussed above, ATM T/R 1 32 receives ATM cells from ATM network 5 or from upstream terminals 1 through primary port 2. When enough cell bytes have been received to determine the VPI/VCI address, ATM T/R 1 32 performs a match and mask compare of the address against internal address registers and, based on the match results, routes cells to one or more output port addresses. Cells may also be discarded if no address match occurs. When an output port address has been determined, cell data is then written into HOLD FIFO 1 36. FIFO manager FMAN 1 39 receives the multi-bit port address strobe signal from ATM T/R 1 32 over lead 41. This address is latched into an FMAN register for later use. All address strobe signal bits are then OR'd together in FMAN 1 39 to act as a write strobe signal that drives the write control signal from FMAN 1 39 to HOLD FIFO 1 36 on lead 42, causing the cell data to be written into HOLD FIFO 1 36 one byte at a time over data lead 37. When it is determined that the cell is valid, it is read out of HOLD FIFO 1 36 over data lead 38 into one or both of LOOP FIFO 1 56, and MPEG-2 reassembly circuits MPEGR 40, based on the latched port address signal. For the video conference terminal function being discussed here, cells are forwarded to downstream terminals via secondary port 3 if the terminal is not an end-of-chain terminal. If the terminal is an end-of-chain terminal, the cell is processed locally in the terminal and is not forwarded via secondary port 3. FMAN 1 39 transmits a read control signal to HOLD FIFO 1 36 over lead 43 and a write control signal to LOOP FIFO 1 56 over lead 59 causing cell data to be read one byte at a time from HOLD FIFO 1 36 into LOOP FIFO 1 56 over data lead 38. When one or more complete cells are in LOOP FIFO 1 56, empty flag LF1_EF on lead 64 to ATM T/R 2 57 is de-asserted. When ATM T/R 2 57 is able, it reads ATM cells from LOOP FIFO 1 56 over data lead 58 by the read control signal on lead 73 and inserts them into its outgoing secondary port 3 data stream.

In the second case of ATM cells being forwarded upstream, ATM T/R 2 57 receives ATM cells from downstream terminals 1 through secondary port 3. When enough cell bytes have been received to determine the VPI/VCI address, ATM T/R 2 57 performs a match and mask compare of the address against internal address registers and, based on the compare results, routes cells to one or more output port addresses. Cells may also be discarded if no address match occurs. When an output port address has been determined, cell data is written into HOLD FIFO 2 60. FIFO manager FMAN 2 62 receives the multi-bit port address strobe signal from ATM T/R 2 57 over lead 63. This address is latched into an FMAN 2 62 register for later use. All address strobe signal bits are then OR'd together in FMAN 2 62 to act as a write strobe signal that drives the write control signal from FMAN 2 62 to HOLD FIFO 2 60 on lead 68, causing the cell data to be written into HOLD FIFO 2 60 one byte at a time over data lead 61. When it is determined that the cell is valid, it is read out of HOLD FIFO 2 60 over data lead 66 into LOOP FIFO 2 65. FMAN 2 62 transmits a read control signal to HOLD FIFO 2 60 over lead 67 and a write control signal to LOOP FIFO 2 65 over lead 69 causing cell data to be read one byte at a time from HOLD FIFO 2 60 into LOOP FIFO 2 65 over data lead 66. When one or more complete cells are in LOOP FIFO 2 65, empty flag LF2_EF on lead 70 from FMAN 2 62 to ATM T/R 1 32 is de-asserted. When ATM T/R 1 32 is able, it reads ATM cells from LOOP FIFO 2 65 over data lead 34 by the read control signal on lead 72 and inserts them into the outgoing primary port 2 data stream.

A more detailed discussion of the components of the video conference terminal of the present invention as shown in FIGS. 2 follows.

ATM transmitter and receiver circuits ATM T/R 1 32 and ATM T/R 2 57 are each preferably a Brooktree Corp. model BT8222 ATM Receiver/Transmitter with Utopia Interface, as described in the BT8222 Data Sheet, Rev. C, Jul. 14, 1995, which is hereby incorporated by reference. In the preferred embodiment, ATM cells received and transmitted via video conference terminal primary ports 1 and secondary ports 2 use the SONET Synchronous Optical Network, OC3 Optical Carrier Level 3, as described in American National Standards Institute (ANSI) specification T1.105–1991, "Telecommunications Digital Hierarchy Optical Interface Rates and Formats Specifications (SONET)," 1991, which is hereby incorporated by reference. Primary ports 1 and secondary ports 2 comprise the high-speed serial line interface connections of the associated BT8222. An STS-3c line framer recovers the frame location from the input serial stream and provides cell octets for cell delineation and processing. Network transmit circuitry receives cell octets from the cell processing functions and adds line framing overhead information as required for specific implementations. HEC and/or PLCP error functions are performed for incoming and outgoing cells. Assembled ATM cells are transmitted to other terminal components over a byte-wide data bus along with a port address-and-write strobe control signal. The address-and-write strobe signal is a 4-bit signal with each bit corresponding to one of four port addresses. Based on a match and mask comparison of the VPI/VCI address of the assembled ATM cell and Header Value and match and mask registers associated with each of the four ports, one or more of the bits of the address signal is strobed to write the cell data to the appropriate destination. Receive circuitry monitors empty flag signals from terminal components to determine if there are any cells waiting to be transmitted out of the terminal. If no cells are waiting, the BT8222 inserts idle cells onto the network. When an empty flag indicates a cell is waiting on one of the four receive port addresses, the BT8222 strobes a read signal to the corresponding device to read the cell. For the BT8222 receive function, the port address scheme serves to assure that only one device writes to the BT8222 data bus at a time.

Figure 3:
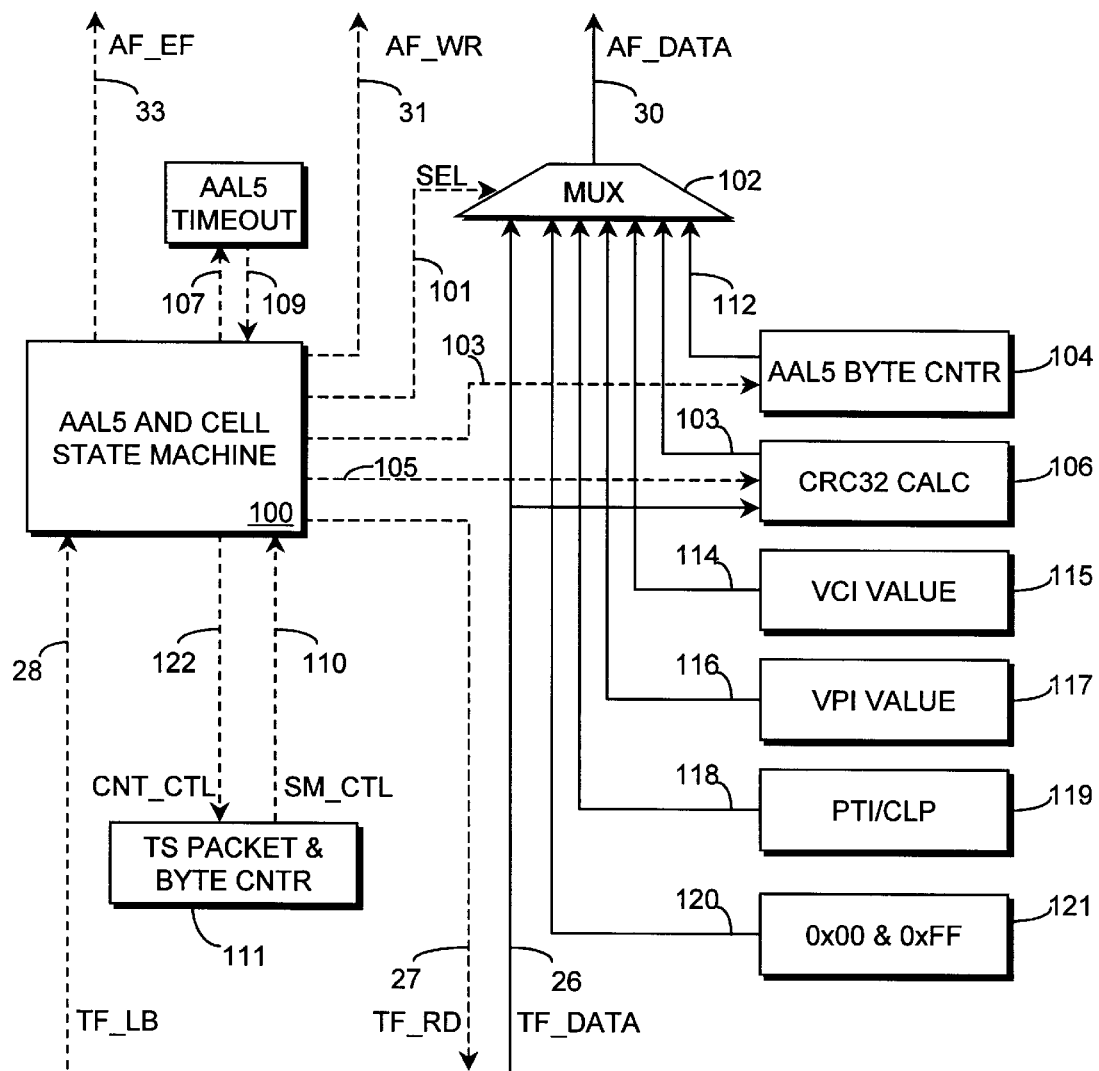
FIG. 3 is a block diagram of the MPEG-2 segmentation circuit of the preferred embodiment of video conference system of the present invention.

FIG. 3 shows a block diagram of the MPEG-2 segmentation circuit MPEGS 25 of the present invention. This circuit is preferably implemented on an AT&T ORCA 2C08 FPGA. AAL5 and Cell state machine 100 transmits ATM FIFO empty flag AT_EF on lead 33 to ATM T/R 1 32, ATM FIFO write signal AF_WR on lead 31 to ATM FIFO 29, TS FIFO read signal on lead 27 to TS FIFO 22, a MUX select signal on lead 101 to MUX 102, a counter increment signal on lead 103 to AAL5 byte counter 104, a CRC32 control signal on lead 105 to CRC32 calculate and compare circuit 106, a counter control signal on lead 122, and a timer start signal on lead 107 to AAL5 timeout circuit 108. AAL5 and Cell state machine 100 also receives a AAL5 timeout signal on lead 109 from AAL5 timeout circuit 108, TS FIFO last byte signal TF_LB on lead 28 from MAVT 21, and a state machine control signal on lead 110 from TS packet and byte counter 111. MUX 102 further receives a data signal on lead 112 from AAL5 byte counter 104, a data signal on lead 113 from CRC32 calculate circuit 106, a data signal on lead 114 from VCI value register 115, a data signal on lead 116 from VPI value register 117, a data signal on lead 118 from payload type identifier and cell loss priority value register 119, a data signal on lead 120 from 0x00 and 0xFF pad byte register 121, and a data signal TF_DATA on lead 26 from TS FIFO 22.

In operation, the circuit reads MPEG-2 transport stream packets from transport stream FIFO TS FIFO 22 over data lead 26 and segments them into ATM cells using AAL5 adaptation layer protocol. The circuit uses a first state machine to construct an AAL5 packet at the ATM cell level, and a second state machine controlled by the first to generate ATM cells from data bytes in TS FIFO 22. MAVT 21 writes a transport stream packet into TS FIFO 22 and signals the first state machine as the last byte of each packet is written. The first state machine cycles the second state machine which reads TS FIFO 22 over data lead 26 and generates individual ATM cells. The second state machine completes the AAL5 packet by loading AAL5 trailer information into the last ATM cell of the AAL5 packet. A regular AAL5 packet of eight 52-byte ATM cells (without the HEC byte) with no padding is formed from two TS packets of 188 bytes. VPI/VCI values stored in internal MPEGS registers are written to the address fields of each ATM cell. Each ATM cell has four header bytes, and the last cell of the AAL5 packet has AAL5 trailer information in the last eight bytes. A short AAL5 packet of five ATM cells can be formed from a single TS packet. In a short AAL5 packet, the fourth ATM cell has four pad bytes, the fifth ATM cell has 40 pad bytes followed by eight bytes of AAL5 trailer information. The state machines essentially drive a very wide MUX with data leads from TS FIFO 22 and several registers containing ATM cell and AAL5 packet overhead information.

MAVT 21 asserts signal TF_LB on lead 28 when the last byte of a TS packet has been written to TS FIFO 22. AAL5 and Cell state machine 100 receives signal TF_LB and begins reading bytes from TS FIFO 22 over data lead 26 and from the other registers connected to MUX 102 to form an AAL5 adaptation layer protocol packet one ATM cell at a time. When cells have been written into ATM FIFO 29 and are waiting to be read by ATM T/R 1 32, ATM FIFO empty flag AF_EF on lead 33 is de-asserted. Up/down counters (not shown) keep track of the number of cells and bytes written into and read out of ATM FIFO 29 to ensure all data is read from the FIFO. As each byte is read from TS FIFO 22, a TS packet byte counter in counter circuit 111 is incremented. When the byte count reaches 188, which is the number of bytes in a TS packet, the state machine increments the TS packet counter of counter circuit 111 to one and clears the byte counter. If another TS packet is waiting to be read in TS FIFO 22, the state machine reads this packet also, and continues to form ATM packets. When the TS packet byte counter again reaches 188, the TS packet counter is incremented to two. At two TS packets read, the state machine then fills in the AAL5 trailer bytes in the eighth ATM cell. If a first 188 bytes have been read from TS FIFO 22 and a second TS packet does not appear in TS FIFO before a predetermined timeout interval, AAL5 timeout circuit 108 asserts a timeout signal on lead 109 causing the state machine to form a single-TS-packet AAL5 packet. The format of the ATM cells of the AAL5 packet is in accordance with Bellcore specification GR-2901-CORE, "Video Transport Over Asynchronous Transport Mode (ATM) Generic Requirements, Issue 1," May, 1995, which is hereby incorporated by reference.

Figure 4:
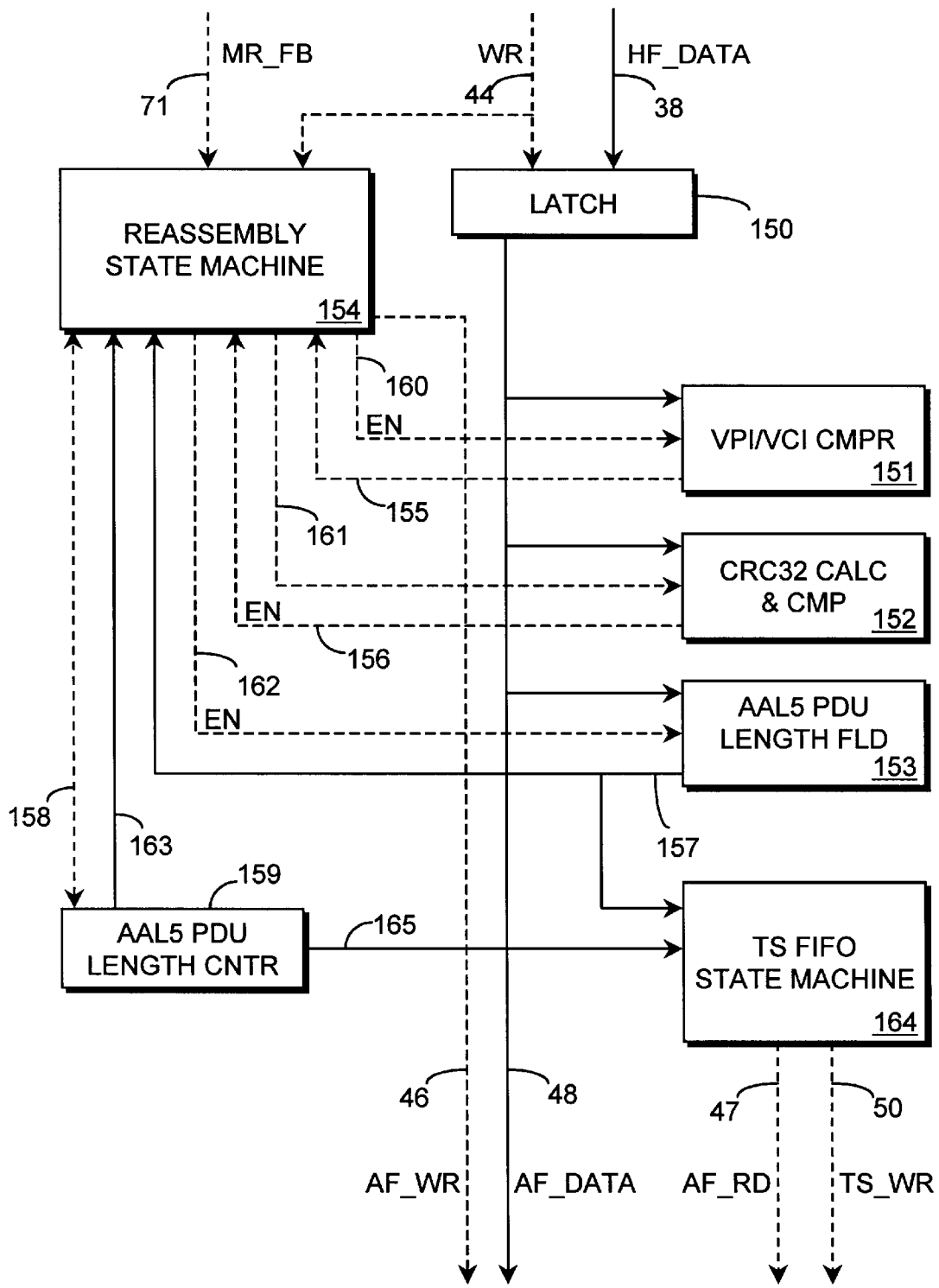
FIG. 4 is a block diagram of the MPEG-2 reassembly circuits of the preferred embodiment of video conference system of the present invention.

FIG. 4 shows a block diagram of the MPEG-2 reassembly circuits MPEGR 40. In the preferred embodiment, MPEGR circuits 40 are implemented on AT&T ORCA 2C08 FPGAs. Latch 150 receives a data signal on lead 38 from HOLD FIFO 36 and a write control signal on lead 44 from FMAN 1 39. Latch 150 serves to keep the data received on data signal 38 active long enough to be processed by the necessary circuit components. Latch 150 transmits a data signal on lead 48 that is received by VPI/VCI compare circuit 151, CRC32 calculate and compare circuit 152, AAL5 PDU length register 153, and AAL5 FIFO 45. Reassembly state machine 154 receives Hold FIFO cell first byte sync signal MR_FB on lead 71 from FMAN 1 39, a VPI/VCI comparison indicator signal on lead 155 from VPI/VCI compare circuit 151, a CRC32 comparison indicator signal on lead 156 from CRC32 calculate and compare circuit 152, a data signal on lead 157 from AAL5 PDU length register 153, and a data signal on lead 158 from AAL5 PDU length counter circuit 159. Reassembly state machine 154 transmits enable signals on leads 160, 161, and 162 to VPI/VCI compare circuit 151, CRC32 calculate and compare circuit 152, and AAL5 PDU length register 153, respectively, a counter control signal on lead 163 to AAL5 PDU length counter circuit 159, and a write signal AF_WR on lead 46 to AAL5 FIFO 45. TS FIFO state machine 164 receives the data signal on lead 157 from AAL5 PDU length register 153, and a data signal on lead 165 from AAL5 PDU length counter circuit 159. TS FIFO state machine 164 transmits read control signal AF_RD on lead 47 to AAL5 FIFO 45, and write control signal TS_WR on lead 50 to TS FIFO 49.

In operation, the MPEGR circuits 40 reassemble MPEG-2 A/V transport stream packets from an incoming AAL5 protocol ATM cell stream. The MPEG-2 A/V transport stream packets are reassembled in accordance with Bellcore specification GR-2901-CORE, "Video Transport Over Asynchronous Transport Mode (ATM) Generic Requirements, Issue 1," May, 1995, which is hereby incorporated by reference. Each MPEGR circuit has a stored VPI/VCI address that is match and mask compared against incoming ATM cells. Cells that do not have matching addresses are discarded. Preferably, each MPEGR of a terminal in the system has a different stored VPI/VCI address for comparison. However, in certain system configurations, it may be desirable for more than one MPEGR circuit in a terminal to share the same VPI/VCI comparison address. Reassembly state machine 154 processes the AAL5 packet one ATM cell at a time, then writes only the payload data into AAL5 FIFO 45. Internal counters track the position of cell and AAL5 packet fields. Reassembly state machine 154 receives signal MR_FB on lead 71 indicating that the byte concurrently being written into latch 50 over data lead 38 from HOLD FIFO 1 36 is the first of an AAL5 packet. As the four header bytes of each ATM cell are written to latch 150, they are also written to VPI/VCI compare circuit 151 over data lead 48 by the enable signal on lead 160. A match and mask comparison is performed between the stored VPI/VCI address and the address in the cell header to determine if the cell is destined for this MPEGR. If the header address and stored address do not match, the cell is discarded. If there is an address match, the rest of the cell is further processed. Reassembly state machine 154 enables CRC32 calculate and compare circuit 152 for the entire payload of the ATM cell, increments AAL5 PDU length counter circuit 159 for each byte of the ATM payload, and writes each AAL5 payload byte into AAL5 FIFO 45. When the AAL5_LAST bit in the cell header indicates that this is the last cell in the AAL5 packet, the CRC32 checksum and the AAL5 PDU length field from the AAL5 trailer data are latched into CRC32 calculate and compare circuit 152 and AAL5 PDU length register 153, respectively. A comparison of the calculated CRC32 checksum and the checksum in the trailer is performed, and the cell is discarded if the two values do not match. A comparison between the AAL5 PDU length counter value and the length value from the trailer is also performed. If the AAL5 packet contains two TS packets, the length counter and the trailer length value should both equal 376. If the AAL5 packet contains one TS packet, the trailer length value should equal 188 and the length counter should equal 232, which includes the four pad bytes in the fourth ATM cell and the 40 pad bytes in the last cell. If these value combinations are not detected, the cell is discarded. If the length comparison is successful, control is turned over to TS FIFO state machine 164. This state machine moves the AAL5 payload data from AAL5 FIFO 45 to TS FIFO 49, stripping off any pad bytes that may be present in AAL5 FIFO 45. The counter value in AAL5 PDU length counter circuit 159 and the length value in AAL5 PDU length register 153 are loaded into two down counters in TS FIFO state machine 164. The amount of padding is the difference between these two values. Each counter then decrements synchronously until both are at a count of zero. The down counter with the AAL5 length field value drives TS FIFO write signal TS_WR on lead 50, while the down counter with the AAL5 PDU length counter value drives AAL5 read signal AF_RD on lead 47. In this manner, only true AAL5 payload bytes will be written to TS FIFO 49. Each down counter is decremented down to zero to properly reset the associated FIFO pointers.

Figure 5:
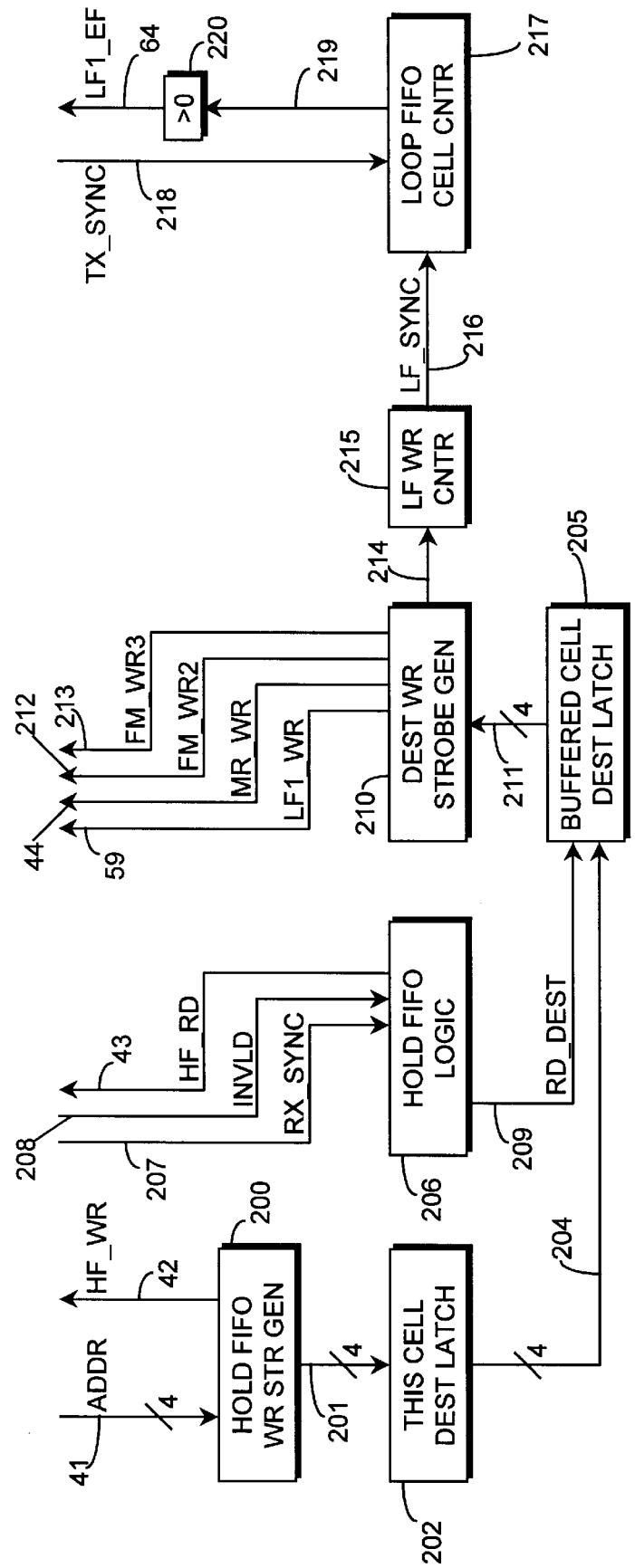
FIG. 5 is a block diagram of the FIFO management circuits of the preferred embodiment of video conference system of the present invention.

FIG. 5 shows a block diagram of FMAN 1 39. FMAN circuits 39 and 62 are implemented on AT&T ORCA 2C10 FPGAs. Although specific reference is made to FMAN 1 39, this discussion applies generally to FMAN 2 62. FMAN 1 39 reads all ATM cells received by ATM T/R 1 32 into HOLD FIFO 1 36, waits for an indication from ATM T/R 1 32 that the cell is valid, and then writes the cell from HOLD FIFO 1 36 into the intended destination. FMAN 1 39 also maintains the Loop FIFO 1 empty flag on lead 64 to ATM T/R 2 57. Hold FIFO write strobe generator 200 receives the 4-bit port address strobe signal on lead 41 from ATM T/R 1 32, and transmits to HOLD FIFO 1 36 the Hold FIFO 1 write control signal HF_WR on lead 42, and a 4-bit address signal on lead 201 to THIS CELL DEST LATCH 202. THIS CELL DEST LATCH transmits a 4-bit address signal on lead 204 to BUFFERED CELL DEST LATCH 205. HOLD FIFO LOGIC circuit 206 receives a cell last byte sync signal RX_SYNC on lead 207 and a cell invalid signal on lead 208, both from ATM T/R 1 32. HOLD FIFO LOGIC circuit 206 transmits Hold FIFO 1 read signal HF_RD on lead 43 to HOLD FIFO 1 36 and a read enable signal RD_DEST on lead 209 to BUFFERED CELL DEST LATCH 205. DEST WR STROBE GEN 210 receives an address signal on lead 211 from BUFFERED CELL DEST LATCH 205, and transmits write control signals LF1_WR on lead 59 to LOOP FIFO 1 56, MR_WR on lead 44 to MPEGR circuits 40, FM_WR2 on lead 212, and FM_WR3 on lead 213. DEST WR STROBE GEN 210 also transmits a Loop FIFO 1 write strobe indicator signal on lead 214 to Loop FIFO 1 write counter circuit 215, which further transmits a last-cell-byte-written-to-Loop-FIFO signal LF_SYNC on lead 216 to LOOP FIFO CELL CNTR 217. LOOP FIFO CELL CNTR 217 receives a last-byte-read-from-Loop-FIFO signal TX_SYNC on lead 218 from ATM T/R 2 57, and transmits a counter value signal on lead 219 to greater-than-zero comparator 220, which further transmits a Loop FIFO 1 empty flag on lead 64 to ATM T/R 2 57.

In operation, Hold FIFO write strobe generator 200 receives the 4-bit port address strobe signal on lead 41 from ATM T/R 1 32. This 4-bit address is latched into THIS CELL DEST LATCH 202. Hold FIFO 1 write control signal HF_WR on lead 42 is generated by Hold FIFO write strobe generator 200 by ORing all bits of the address strobe signal on lead 41. Signal HF_WR on lead 42 causes the cell being received by ATM T/R 1 32 to be written to HOLD FIFO 36 one byte at a time. Five bytes before the last byte of the cell has been written into HOLD FIFO 1 36, ATM T/R 1 32 determines if the cell is valid. If the cell is invalid, signal INVLD on lead 208 is asserted and the cell is discarded. When the last byte of the cell is written into HOLD FIFO 1 36, signal RX_SYNC is asserted by ATM T/R 1 32 on lead 207. If signal INVLD indicates a valid cell, the cell destination port address is written to BUFFERED CELL DEST LATCH 205 over data lead 204 by read control signal 209. HOLD FIFO LOGIC circuit 206 then generates read control signals on lead 43 to HOLD FIFO 1 36 while DEST WR STROBE GEN 210 generates write control signals to the address indicated by BUFFERED CELL DEST LATCH 205. In the illustrated embodiment, ATM cells from ATM T/R 1 32 have only two destinations: LOOP FIFO 1 56 or MPEGR circuits 40. The write signals to these circuits are leads 59 and 44 from DEST WR STROBE GEN 210. Because ATM T/R 1 32 has four destination ports available, write control signals FM_WR2 and FM_WR3 on leads 212 and 213, respectively, are shown and may be used in alternative embodiments. FMAN 1 32 also maintains the Loop FIFO 1 empty flag signal LF1_EF on lead 64. If DEST WR STROBE GEN 210 is strobing write signal LF1_WR on lead 59 to LOOP FIFO 1 56, Loop FIFO 1 write strobe indicator signal on lead 214 is incrementing counter LF WR CNTR 215. When this counter reaches 52, indicating the last byte of a cell has been written to LOOP FIFO 1 56, signal LF_SYNC on lead 216 is strobed, incrementing up/down counter LOOP FIFO CELL CNTR 217. This counter value is transmitted on lead 219 to greater-than-zero comparator 220 and if the counter value is greater than zero, signal LF1_EF is de-asserted, indicating that there is an unread cell in LOOP FIFO 1 56. As ATM T/R 2 57 reads bytes from LOOP FIFO 1 56, signal TX_SYNC on lead 218 will be strobed as the last byte of each cell is read. This strobe will cause LOOP FIFO CELL CNTR 217 to decrement. If the counter value is zero, indicating that there are no unread cells in LOOP FIFO 1 56, signal LF1_EF on lead 64 will be asserted.

Figure 6:
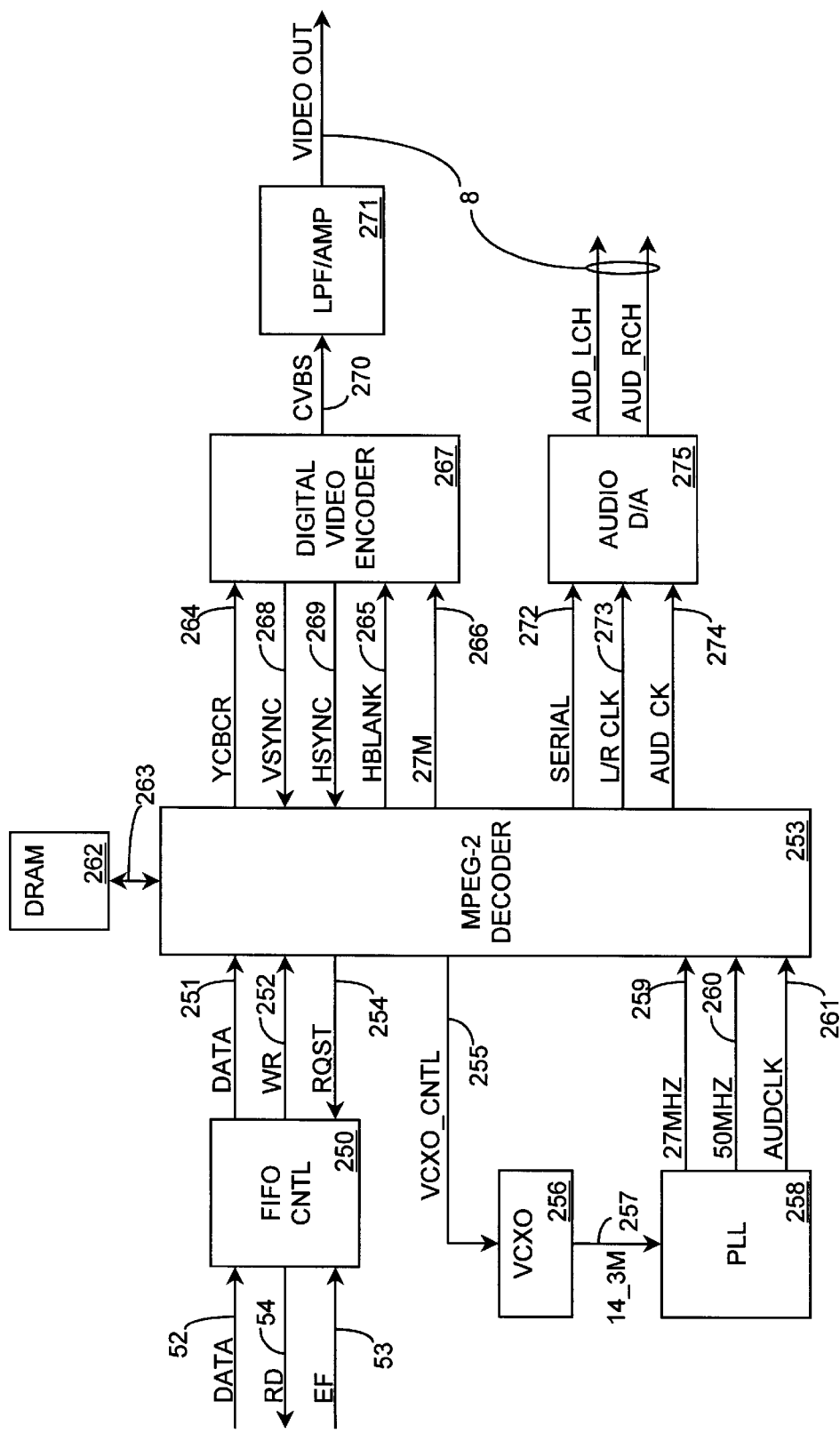
FIG. 6 is a block diagram of the MPEG-2 AAL5 audio/video transport stream-to-audio and video analog signal circuit of the preferred embodiment of video conference system of the present invention.

FIG. 6 shows a block diagram of MPEG-2 A/V receive circuits MAVR 51. There are three identical MAVR circuits per video conference terminal in the illustrated embodiment. TS FIFO control block 250 receives a data signal on lead 52 and a TS FIFO empty flag on lead 53 from TS FIFO 49, and transmits a read control signal on lead 54 to TS FIFO 49. TS FIFO logic block 250 further transmits a data signal on lead 251 and a write control signal on lead 252 to MPEG-2 decoder circuit 253, and receives a data request signal on lead 254 from MPEG-2 decoder circuit 253. MPEG-2 decoder 253 also transmits an oscillator control signal VCXO_CNTL on lead 255 to 14.31818 MHz oscillator VCXO 256, which in turn transmits a nominal 14.31818 MHz oscillator output signal 14_3M on lead 257 to phase lock loop circuit PLL 258. PLL 258 transmits 27 MHz video clock signal 27MHZ on lead 259, 50 MHz video clock signal 50MHZ on lead 260 and audio clock signal AUDCLK on lead 261, all to MPEG-2 decoder 253. MPEG-2 decoder 253 is connected to a 16 Mbit DRAM 262 over lead 263. MPEG-2 decoder 253 further transmits video color value signal YCBCR on lead 264, horizontal blanking signal HBLANK on lead 265 and video clock signal 27M on lead 266 to digital video encoder 267. Digital video encoder 267 further transmits vertical sync signal VSYNC on lead 268 and horizontal sync signal HSYNC on lead 269 to MPEG-2 decoder 253, and NTSC composite video output signal CVBS on lead 270 to low-pass filter and video amp LPF/AMP 271. LPF/AMP 271 transmits the video output signal on the video leads of leads 8, 9, or 10 to, for example, a video monitor connected to the terminal. MPEG2 decoder 253 also transmits audio serial data signal SERIAL on lead 272, left-right channel frame sync signal L/R CLK on lead 273, and audio clock signal AUD_CK on lead 274, all to audio digital-to-analog converter AUDIO D/A 275. AUDIO D/A 275 transmits left channel audio signal AUD_LCH and right channel audio signal AUD_RCH on the two audio leads of leads 8, 9, or 10 to, for example, a video monitor or a stereo speaker system connected to the terminal.

In operation, when TS FIFO empty flag signal on lead 53 indicates that an MPEG-2 transport stream packet is waiting to be read in TS FIFO 49 and the data request signal on lead 254 indicates that MPEG-2 decoder 253 is ready for data, FIFO CNTL 250 reads data bytes on 8-bit lead 52 from TS FIFO 49 by the read signal on lead 54 and writes a serial bit stream on data lead 251 to MPEG-2 decoder 253 by write signal 252. MPEG-2 decoder is preferably a Hyundai Electronics model HDM8211P MPEG-2 Audio, Video, and Systems Decoder, as described in the HDM8211P User's Manual, Rev. 4.00, August, 1995, which is hereby incorporated by reference. MPEG-2 decoder 253 decodes the MPEG-2 transport packet into separate video and audio digital signals. MPEG-2 decoder 253 uses 16 Mbit DRAM 262 for MPEG data buffering, storage of pictures, and some code storage. MPEG-2 decoder 253 also uses external 14.31818 MHz voltage controlled oscillator VCXO 256 and phase lock loop (PLL) circuit 258 to generate the audio and video timing signals needed to output the digital video and audio signals. VCXO 256 can be any one of several commercially available voltage controlled oscillators tailored to video applications. PLL 258 is preferably a Chrontel, Inc. model CH9081 MPEG Playback Clock Generator, as described in the CH9081 Data Sheet, Rev. 1.0, Feb. 23, 1995, which is hereby incorporated by reference. VCXO 256 has a nominal output frequency of 14.31818 MHz, but can be varied by the VCXO control signal on lead 255 as required by the presentation time stamp information in the incoming TS packets. PLL 258 receives nominal 14.31818 MHz signal 14_3M on lead 257 and generates jitter-free 27 MHz, 50 MHz, and audio clock signals on leads 259, 260, and 261, respectively. Digital video encoder 267 is preferably a Brooktree Corp. model Bt856 Y,Cr,Cb or RGB NTSC/PAL Digital Video Encoder, as described in the Bt856 Data Sheet, pub. no. L856001, Rev. C, Jul. 21, 1995, which is hereby incorporated by reference. Digital video encoder 267 receives compressed YCrCb video in 16-bit mode on lead 264 from MPEG-2 decoder 253, and transmits an NTSC composite video signal in CVBS (composite video with blanking and syncs) form on lead 270. This video signal is transmitted to low-pass filter and amp 271 where high frequency noise is removed, and the signal is further transmitted to a video device over the video lead of leads 8. The audio information is decoded from the MPEG-2 TS packet and transmitted to Audio D/A circuit 275, which is preferably a Burr-Brown Corp. model PCM1710 SoundPlus Stereo Audio Digital-to-Analog Converter, as described in the PCM1710 Data Sheet, pub. no. PDS-1217B, June, 1995, which is hereby incorporated by reference. A serial bit stream of 16-bit samples from alternating channels is transmitted by MPEG-2 decoder 253 over lead 272 to audio D/A 275. Signal L/R CLK on lead 273 synchronizes the data and indicates left-channel data (L/R CLK high) or right channel data (L/R CLK low). Audio D/A 275 transmits 600 ohm balanced stereo analog output over the audio leads of leads 8.

Figure 7:
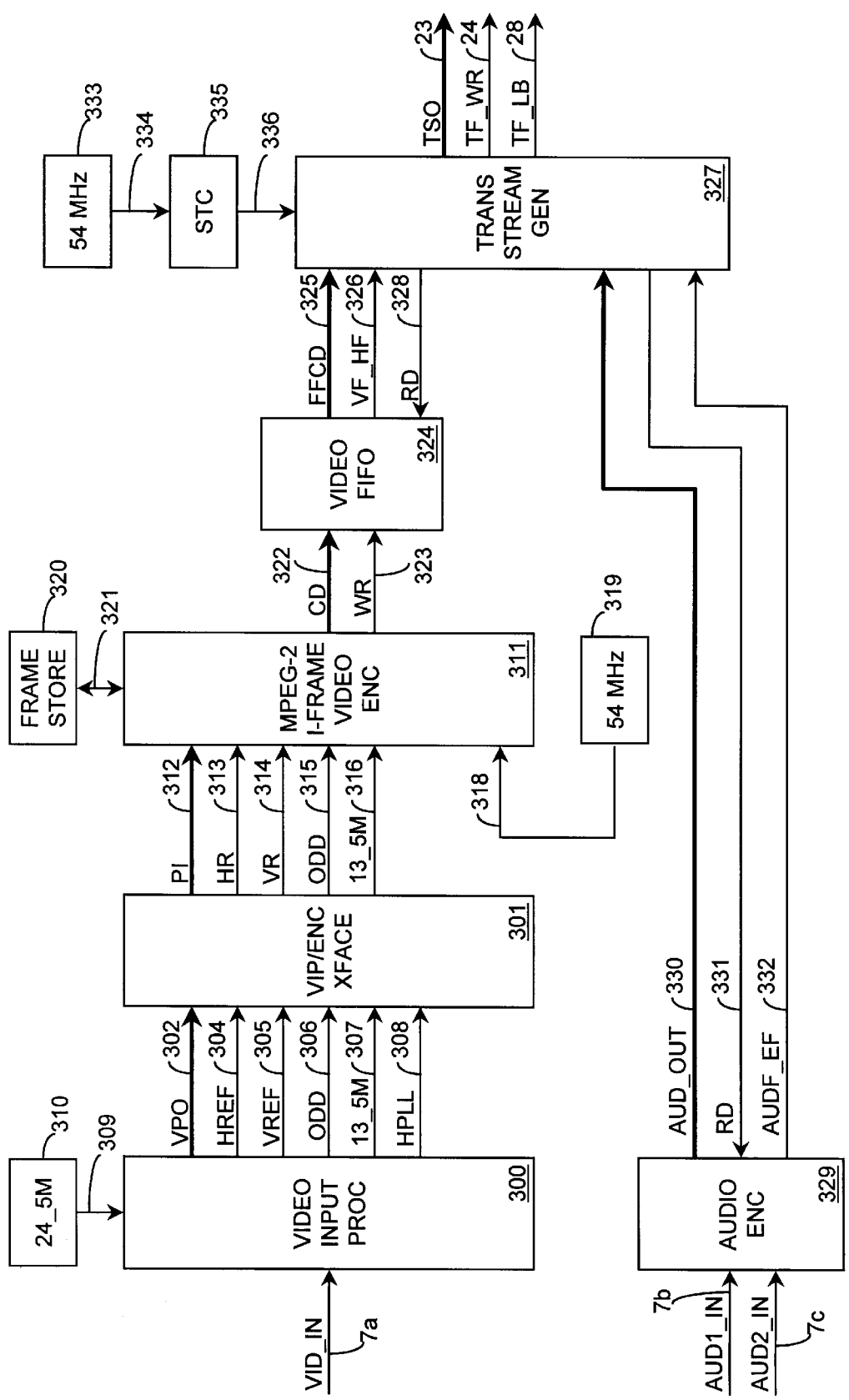
FIG. 7 is a block diagram of the audio and video analog-to-MPEG-2 AAL5 audio/video transport stream generation circuit of the preferred embodiment of video conference system of the present invention.

FIG. 7 shows a block diagram of MPEG-2 A/V transmit circuit MAVT 21. This circuit receives NTSC video and two channels of audio from, for example, a video camera as analog input, converts the analog input into MPEG-2 I-Frame compressed video elementary stream (ES) and MPEG-2 compressed digital audio ES data, converts the elementary stream data into packetized elementary stream (PES) data, and combines the PES data into MPEG-2 transport stream packets for further processing by MPEG-2 segmentation circuit MPEGS 25. Video input processor 300 receives NTSC analog video signal VID_IN on lead 7a from, for example, a video camera. VIP 300 also receives a 24.576 MHz timing signal from oscillator circuit 24_5M 310. Oscillator circuit 24_5M 310 is preferably any one of several commercially available oscillators with a 24.576 MHz output timing signal. Video input processor 300 is preferably a Philips Electronics N. V. model SAA7111 Video Input Processor (VIP), as described in the SAA7111 Data Sheet, Preliminary Specification, Oct. 30, 1996, which is hereby incorporated by reference. VIP 300 transmits the following signals to VIP/Encoder interface circuit 301: video port out signal VPO on 16-bit data bus 302, horizontal reference signal HREF on lead 304, vertical reference signal VREF on lead 305, odd field picture indicator signal ODD on lead 306, line-locked 13.5 MHz clock signal 13_5M on lead 307, and horizontal phase lock locked signal HPLL on lead 308. VIP/encoder interface circuit 301 transmits the following signals to MPEG-2 I-Frame video encoder 311: video 16-bit pixel data bus signal PI on lead 312, horizontal reference signal HR on lead 313, vertical reference signal VR on lead 314, odd field picture indicator signal on lead 315, and 13.5 MHz clock signal 13_5M on lead 316. MPEG-2 I-Frame video encoder 311 also receives a 54 MHz clock signal on lead 318 from 54 MHz oscillator 319, and is connected to an 32 Mbit DRAM 320 over lead 321. MPEG-2 I-Frame video encoder 311 is preferably an IBM Corp model IBM39 MPEGSE1 CFB 20 C MPEG-2 Digital Video I-Frame Encoder, as described in the IBM39 MPEGSE1 CFB 20 C Data Sheet, Rev. 3, pub. no. DVPSE1MNL-01, July, 1995, which is hereby incorporated by reference. DRAM 320 is preferably implemented as two 256 K×16-bit DRAMS. MPEG-2 I-Frame video encoder 311 transmits compressed data output signal CD on lead 322 and a write control signal on lead 323 to video FIFO 324. Video FIFO 324 is preferably two 32 K×9-bit FIFOs in parallel. Video FIFO 324 transmits 16-bit data signal FFCD on lead 325 and FIFO half full flag VF_HF on lead 326, both to transport stream generator 327, and receives a read control signal on lead 328 from transport stream generator 327. Transport stream generator 327 is preferably an Analog Devices, Inc. model ADSP-2171 Digital Signal Processor (DSP) Microcomputer, as described in the ADSP-2171 Data Sheet, Rev. A, 1995, which is hereby incorporated by reference. Transport stream generator 327 also receives system timing clock data on bus 336 from 42-bit counter circuit STC 335, which is driven by 54 MHz clock 333 over lead 334. Audio encoder circuit 329 receives balanced dual channel analog audio signals 7b and 7c from, for example, a video camera. Audio encoder circuit 329 is preferably an Atlanta Signal Processors, Inc. model A1023 MPEG Audio Encoder Module, as described in the A1023 Data Sheet, Rev. 8, Dec. 5, 1995, which is hereby incorporated by reference. Audio encoder circuit 329 transmits 8-bit data signal AUD_OUT on lead 330 and audio FIFO empty flag AUDF_EF on lead 331, both to transport stream generator 327, and receives a read control signal on lead 332 from transport stream generator 327. Transport stream generator 327 transmits 8-bit transport stream data output signal TSO on lead 23 and TS FIFO write control signal TF_WR on lead 24, both to TS FIFO 22, and TS packet last byte written signal TF_LB on lead 28 to MPEGS 25.

In operation, VIP 300 receives NTSC analog video signal VID_IN on lead 7a from, for example, a video camera. VIP 300 is provisioned to convert the analog video signal to digital Y,Cb,Cr 4:2:2 format, and transmit this data as video port out signal VPO on 16-bit lead VPO 302. The data is clocked out by 13.5 MHz clock signal 13_5M on lead 308. Signals HREF and VREF are horizontal and vertical synchronization signals, and signal ODD indicates whether the video data is for the odd or even picture field. Signal HPLL indicates that the horizontal phase lock loop within VIP 300 is locked to the incoming video signal's horizontal frequency. VIP/ENC XFACE 301 converts the output signals of VIP 300 to the input signal requirements of MPEG-2 I-Frame video encoder 311, as specified in their respective data sheets. In general, although the output signals of VIP 300 correspond to the input signals of video encoder 311, the VIP 300 output signals occur at different points of the data stream and are of different lengths than is expected by video encoder 311. VIP/ENC XFACE 301 converts the timing and duration of the VIP 300 output signals so as to be acceptable to video encoder 311. Video encoder 311 clocks in the Y,Cb,Cr 4:2:2 formatted digital video input data signal PI on 16-bit lead 312 by 13.5 MHz clock signal 13_5M on lead 316 and compresses the data signal into a 4:2:0 formatted elementary stream (ES) data output signal CD on 16-bit lead 322. The ES data output signal is written to video FIFO 324 by write control signal 323. Transport stream generator 327 monitors video FIFO half full flag 326, and when it is asserted, reads data out as signal FFCD over 16-bit lead 325 by read control signal 328. Audio encoder circuit 329 receives 600 ohm balanced dual channel analog audio signals AUD1_IN on lead 7b and AUD2_IN on lead 7c and encodes the audio signals into a MPEG-2 ES format output data signal AUD_OUT on 8-bit lead 330 to transport stream generator 327. Transport stream generator 327 monitors audio FIFO empty flag 332, and when data is present, reads it out by read control signal 331. Transport stream generator 327 receives video ES data as signal FFCD on lead 325 and audio ES data as signal AUD_OUT on lead 330, generates audio packetized elementary stream (PES) data and video PES data, and then forms MPEG-2 transport stream packets for transmission as output signal TSO on 8-bit lead 23 to TS FIFO 22. Transport stream generator 327 is provisioned by means of software to perform the necessary field conversions and computations. Presentation time stamp data for the TS packets is read from 42-bit counter STC 335.

The MPEG audio elementary stream (ES) format is defined in International Standards Organization (ISO)/ International Electrotechnical Commission (IEC) standard 11172-3, "Coding of Moving Pictures and Associated Audio for Digital Storage Media at Up To About 1.5 Mbit/s—Part 3: Audio," ISO, 1993, which is hereby incorporated by reference. The MPEG-2 format is defined in ISO/IEC standard 13818-1, "Generic Coding of Moving Motion Pictures and Associated Audio Information," ISO, June 1994, which is hereby incorporated by reference.

The FIFOs used in the preferred embodiment of the present invention are Integrated Device Technology, Inc. models 7200, 7201 and 7206, as appropriate, as described in their respective data sheets.

Alternative embodiments may also include a host processor and/or component level processors to handle such tasks as system initialization error logging and network management functions. Generic cell in and generic cell out functions may also be implemented to assist with various desired network and circuit administrative functions. Although the preferred embodiment describes a system using SONET protocol, other protocols such as DS3, STS3c, or a combination thereof, may be used.

While the inventive system has been particularly shown and described, it is not intended to be exhaustive nor to limit the invention to the embodiment disclosed. It will be apparent to those skilled in the art that modifications can be made to the present invention without departing from the scope and spirit thereof. It is intended that the scope of the invention be defined by the claims appended hereto and their equivalents.

What is claimed is:

1. A multipoint video conference system for use in an ATM network, said ATM network operated to generate relayed ATM cells having ATM addresses, said multipoint video conference system comprising:

a plurality of video conference terminals, each having first and second ATM ports, a video input port and a plurality of video output ports, said terminals being in a daisy-chain arrangement wherein each of said first ATM ports is coupled to said second ATM port of the adjacent upstream terminal, and wherein said first ATM port of the first terminal is coupled to said ATM network and said second ATM port of the last terminal is unconnected;

each of said terminals operated to receive an analog video program signal on a video input port, each of said video input ports having an associated unique ATM address, and to enter said analog video program signal and said unique ATM address into video program ATM cells and transmit said video program ATM cells at said first ATM port;

each of said terminals further operated in response to said video program ATM cells received at said second ATM port to forward all of said received video program ATM cells at said first ATM port, whereby each of said received video program ATM cells is forwarded by each of said terminals upstream to said first terminal and then transmitted onto said ATM network;

wherein said ATM network is further operated in response to receiving said video program ATM cells to generate said relayed ATM cells, said relayed ATM cells having the same contents, and a relayed cell ATM address that corresponds in a one-to-one manner with the said unique ATM address of said received video program ATM cells, and to relay said relayed ATM cells to said first ATM port of said first ATM terminal;

each of said terminals further operated in response to said relayed ATM cells received at said first ATM port to forward all of said received relayed ATM cells at said second ATM port, whereby each of said received relayed ATM cells is forwarded by each of said terminals downstream to said last terminal; and each of said terminals further operated to receive said relayed ATM cells at said first ATM port, each of said relayed ATM cells having a predetermined one or more of said relayed ATM cell addresses, and generate a plurality of said analog video program signals and transmit said analog video program signals at a plurality of video output ports, each of said video output ports associated with one of said predetermined unique addresses, whereby each of said relayed ATM cells may be received by a plurality of said terminals to generate one of said analog video program signals.

2. The multipoint video conference system of claim 1, wherein:

said video conference system further comprises a plurality of daisy-chains, each of said daisy-chains having a first terminal, each of said first ATM ports of each of said first terminals being coupled to said ATM network; and wherein said ATM network is further operated in response to receiving said video program ATM cells to generate said relayed ATM cells, and to relay said relayed ATM cells to each of said first ATM ports of each of said first ATM terminals.

3. The multipoint video conference system of claim 1, wherein each of said terminals is further operated in response to said relayed ATM cells received at said first ATM port to forward all of said received relayed ATM cells at said second ATM port, each of said relayed ATM cells having a predetermined one or more of said relayed ATM cell addresses.

* * * * *